US009161081B2

(12) United States Patent
Eck

(10) Patent No.: US 9,161,081 B2

(45) Date of Patent: Oct. 13, 2015

(54) HDCP LINK INTEGRITY CHECKING WITH DETECTION OF ENHANCED LINK VERIFICATION SUPPORT

(75) Inventor: John P. Eck, Dacula, GA (US)

(73) Assignee: ARRIS Technology, Inc., Suwanee, GA (US)

( * ) Notice: Subject to any disclaimer, the term of this patent is extended or adjusted under 35 U.S.C. 154(b) by 716 days.

(21) Appl. No.: 13/024,321

(22) Filed: Feb. 9, 2011

(65) Prior Publication Data

US 2012/0201372 A1 Aug. 9, 2012

(51) Int. Cl.
*G06F 17/30* (2006.01)
*H04N 21/4363* (2011.01)

(52) U.S. Cl.
CPC .............................. *H04N 21/43635* (2013.01)

(58) Field of Classification Search
CPC ............... H04L 63/0428; H04L 63/12; H04L 2463/101; G11B 20/00086; G06F 21/10; G06F 21/606; H04N 5/913
USPC .................... 713/400–401; 714/12; 709/224; 375/354; 710/61; 380/201; 726/27
See application file for complete search history.

(56) References Cited

U.S. PATENT DOCUMENTS

| | | | | |
|---|---|---|---|---|
| 8,059,539 | B2 * | 11/2011 | Cochran | 370/232 |
| 8,713,213 | B1 * | 4/2014 | Yildiz et al. | 710/17 |
| 2005/0144468 | A1 * | 6/2005 | Northcutt et al. | 713/189 |
| 2011/0013772 | A1 * | 1/2011 | Roethig et al. | 380/200 |
| 2012/0201372 | A1 * | 8/2012 | Eck | 380/2 |

OTHER PUBLICATIONS

Vine, Michael, A. , C Programming for the Absolute Beginner, Course Technology, Second Edition, chapter 4.*
Digital Content Protection LLC, "High-bandwidth Digital Content Protection System", Revision 1.4 (Jul. 2009).

* cited by examiner

*Primary Examiner* — Farid Homayounmehr
*Assistant Examiner* — Lizbeth Torres-Diaz
(74) *Attorney, Agent, or Firm* — Stewart M. Wiener

(57) ABSTRACT

A method is disclosed for checking HDCP link integrity in a High-bandwidth Digital Content Protection (HDCP) transmitter. From an HDCP receiver communicatively coupled to the HDCP transmitter by an HDCP-protected interface, a single-bit value indicative of HDCP 1.1 feature support is read. When the single-bit value is true, HDCP Enhanced Link Verification is used in the HDCP transmitter. When the single-bit value is false, the method determines whether the HDMI receiver supports HDCP Enhanced Link Verification, and if so, HDCP Enhanced Link Verification is used in the HDCP transmitter.

13 Claims, 4 Drawing Sheets

HDCP LINK INTEGRITY CHECKING WITH DETECTION OF ENHANCED LINK VERIFICATION SUPPORT

BACKGROUND

HDCP (High-bandwidth Digital Content Protection) is a standard for protecting digital content over certain interfaces; between, for example, a set-top box (STB) transmitting audio and video over HDMI (High Definition Multimedia Interface) and a television receiving HDMI. Protection is accomplished by encrypting the data before it leaves the transmitter. A legitimate receiver then decrypts the data.

HDCP-protected interfaces can include, for example, HDMI, Digital Visual Interface (DVI), Unified Display Interface (UDI), Giga-bit Video Interface (GVIF), and DisplayPort. HDCP requirements are set forth in the HDCP specification, which is available from Digital Content Protection LLC. Revision 1.4 (July 2009) of the HDCP specification is incorporated by reference herein.

Successful decryption requires strict authentication and synchronization between transmitter and receiver. Should there be a loss of authentication or synchronization, video will be unintelligible (e.g., a snowy picture). Therefore, it is imperative that a verification mechanism be in place for continuously monitoring the link so that corrective action can be taken should a loss of authentication or synchronization occur.

Synchronization loss, while relatively uncommon, provides a negative experience for a viewer when it occurs in practice. By way of illustration, sometimes synchronization loss may be caused by imperfect firmware in an STB which results in problems or incompatibilities with certain models of televisions; other times, imperfect firmware in certain televisions may make them particularly sensitive. Other exemplary causes may include strong electromagnetic interference, or hardware-related causes such as issues with the HDMI cable (e.g., excessive length and/or poor quality) in combination with a high resolution video format (higher resolutions have a higher clock speed over the HDMI cable), or a connector compromised in some way. Where synchronization loss is associated with hardware-related causes, an excessive problem for a particular subscriber will likely be corrected by replacing the hardware, but minor physical compromises or conditions whereby a snowy picture is only induced occasionally may go uncorrected for extended periods of time.

Naturally, synchronization loss cannot be corrected by an HDCP transmitter until the out-of-sync condition is detected by the HDCP transmitter. The mechanism defined by the original HDCP specification provides a computational check in which both transmitter and receiver maintain a 16-bit Ri value that is updated every 128 frames. The transmitter, in a HDCP link maintenance loop usually implemented as a software routine, compares its Ri value with the Ri value read from the receiver. A mismatch indicates that the receiver may have lost authentication and corrective action should be taken. This Ri check is adequate for detecting loss of authentication, but has limitations for detecting synchronization loss.

In an effort to improve upon shortcomings of the Ri mechanism, the HDCP 1.1 specification introduced a feature called Enhanced Link Verification, a computational check in which both transmitter and receiver maintain an 8-bit Pj value. Unlike the Ri value, the Pj value is based upon the value of a decrypted video pixel. The HDCP specification provides that for every 16th frame counter increment, the decrypted value of channel zero of the first pixel is combined with the least significant byte Rj using the XOR operation, and the result is made available on the Pj port. This makes detecting the ability of the receiver to decrypt much more deterministic. Also, Pj is updated more often than Ri, every 16 frames rather than every 128 frames. The use of Enhanced Link Verification significantly reduces the time required for a typical HDCP transmitter to detect an out-of-sync condition. Enhanced Link Verification was not in the original HDCP specification, and accordingly it is not supported by all HDCP devices.

Enhanced Link Verification was introduced into the HDCP 1.1 specification along with other enhancements (Enhanced Encryption Status Signaling, Advance Cipher), which together are known as the "1.1 features" or "1.1 feature set." An HDCP receiver's support for the entire 1.1 feature set is indicated by a single bit value (1.1_FEATURES) that is determined (e.g., by the receiver's manufacturer) and stored in the receiver's Bcaps register. An HDCP receiver must support the entire 1.1 feature set in order for the 1.1_FEATURES bit to be set to a value of 1 (true) in the Bcaps register.

Some HDCP receivers fully support the entire 1.1 feature set and indicate this to the transmitter by setting the 1.1_FEATURES bit. Other receivers do not support any of the 1.1 features and therefore do not set the 1.1_FEATURES bit. There is a third category of HDCP receivers that fully support Enhanced Link Verification (and perhaps other portions of the 1.1 feature set), but that do not set the 1.1_FEATURES bit in the Bcaps register; for example, perhaps because the receiver's manufacturer encountered interoperability issues with some portion of the 1.1 feature set other than Enhanced Link Verification. For this third category of HDCP receivers, synchronization loss could be more quickly detected using Enhanced Link Verification. However, conventional HDCP transmitters relying solely on the receiver's 1.1_FEATURES bit are unable to detect that these receivers support Enhanced Link Verification, and accordingly the transmitters do not attempt to use Enhanced Link Verification.

SUMMARY

In one embodiment of the present invention, a method is provided for checking HDCP link integrity in a High-bandwidth Digital Content Protection (HDCP) transmitter. From an HDCP receiver communicatively coupled to the HDCP transmitter by an HDCP-protected interface, a single-bit value indicative of HDCP 1.1 feature support is read. When the single-bit value is true, HDCP Enhanced Link Verification is used in the HDCP transmitter. When the single-bit value is false, the method determines whether the HDMI receiver supports HDCP Enhanced Link Verification, and if so, HDCP Enhanced Link Verification is used in the HDCP transmitter.

In another embodiment of the present invention, a High-bandwidth Digital Content Protection (HDCP) transmitter for checking HDCP link integrity is provided. The HDCP transmitter includes an HDCP-protected interface configured for reading, from an HDCP receiver communicatively coupled to the HDCP transmitter by the HDCP-protected interface, a single-bit value indicative of HDCP 1.1 feature support. The HDCP transmitter is configured, when the single-bit value is true, to use HDCP Enhanced Link Verification in the HDCP transmitter. The HDCP transmitter is further configured, when the single-bit value is false, to determine whether the HDMI receiver supports HDCP Enhanced Link Verification, and if so, to use HDCP Enhanced Link Verification in the HDCP transmitter.

DETAILED DESCRIPTION

Figure 1:
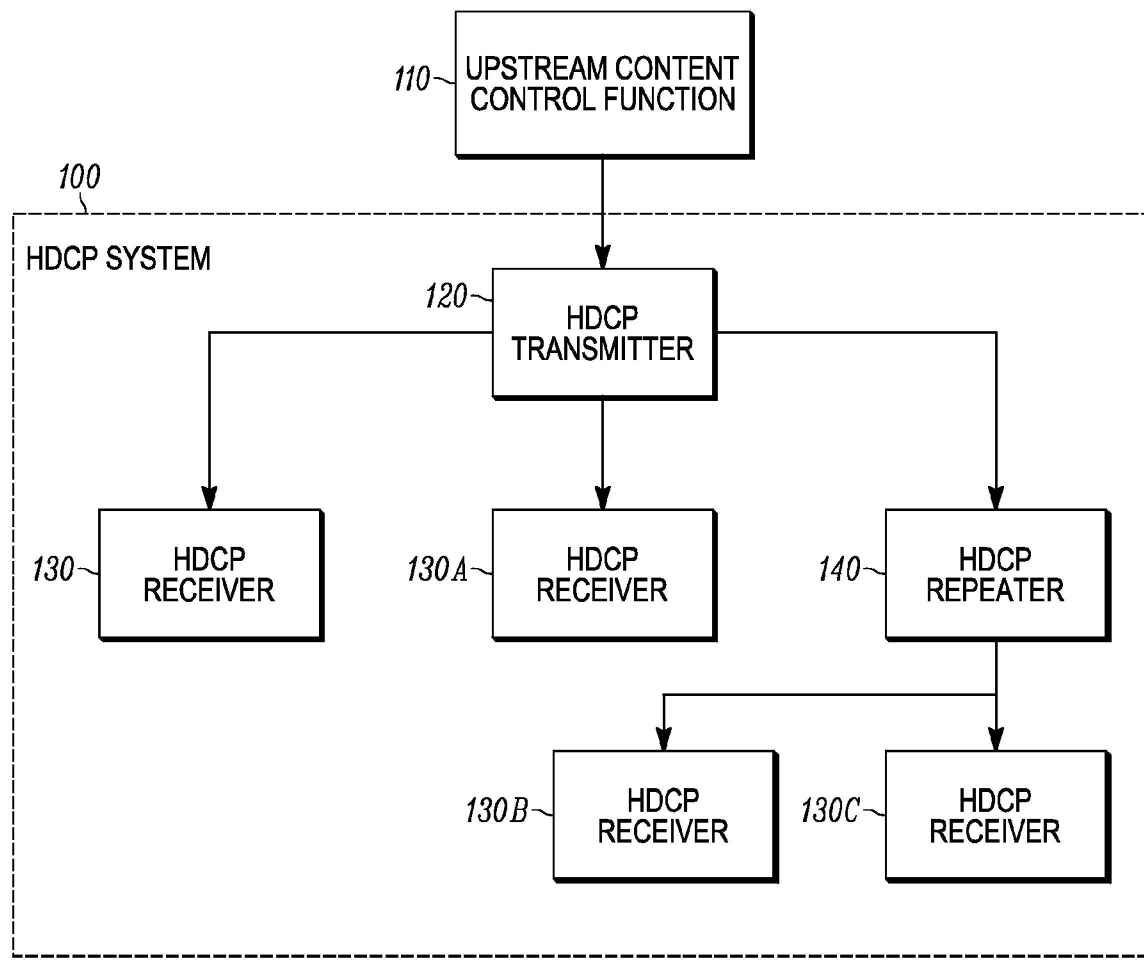
FIG. 1 is a block diagram that illustrates exemplary connections in a prior art HDCP system suitable for use in accordance with an embodiment of the present invention.

Aspects of the present invention improve the ability of an HDCP transmitter to detect an out-of-sync condition so a snowy picture is corrected more quickly for certain HDCP receivers. In an embodiment, a method can be followed by the HDCP transmitter for determining when a receiver supports Enhanced Link Verification but does not indicate so by means of the 1.1_FEATURES bit flag; the method thereby allows the transmitter to take advantage of Enhanced Link Verification when connected to this category of receiver and more readily determine when the receiver is no longer able to decrypt the video data.

Before describing in detail embodiments that are in accordance with the present invention, it should be observed that the embodiments reside primarily in combinations of method steps and apparatus components related to a system and method for distributed recording of content. Accordingly, the apparatus components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms “comprises,” “comprising,” or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by “comprises . . . a” does not, without more constraints, preclude the existence of additional identical elements in the process, method, article, or apparatus that comprises the element.

FIG. 1 is a block diagram that illustrates exemplary connections in a prior art HDCP system 100 suitable for use in accordance with an embodiment of the present invention. However, it will be understood by a person having ordinary skill in the art that aspects of the invention can be practiced using a system having other than the specific features or limitations of the illustrative content HDCP system 100 described herein.

HDCP system 100 receives HDCP content from a source, such as an upstream content control function 110 which is not part of the HDCP system 100. The HDCP content is audio-visual content protected by the HDCP system 100, which is in encrypted form during its transfer from an HDCP transmitter to an HDCP receiver over an HDCP-protected interface.

HDCP system 100 includes an HDCP transmitter 120 for encrypting and transmitting HDCP content, and at least one HDCP receiver 130 for receiving and decrypting HDCP content. HDCP devices such as HDCP transmitter 120 and HDCP receiver 130 are connected by HDCP-protected interfaces (such as DVI or HDMI). If sufficient HDCP-protected interface ports are available in the HDCP transmitter 120, numerous additional HDCP receivers (such as HDCP receiver 130A in the exemplary illustration) may be connected to the HDCP transmitter 120, in a tree topology. An exemplary HDCP system 100 can include zero or more HDCP repeaters, such as HDCP repeater 140. An HDCP repeater 140 includes one or more HDCP receivers for receiving and decrypting HDCP content, and one or more HDCP transmitters for re-encrypting and transmitting the HDCP content to downstream HDCP receivers (such as HDCP receivers 130B, 130C in the exemplary illustration).

Figure 2:
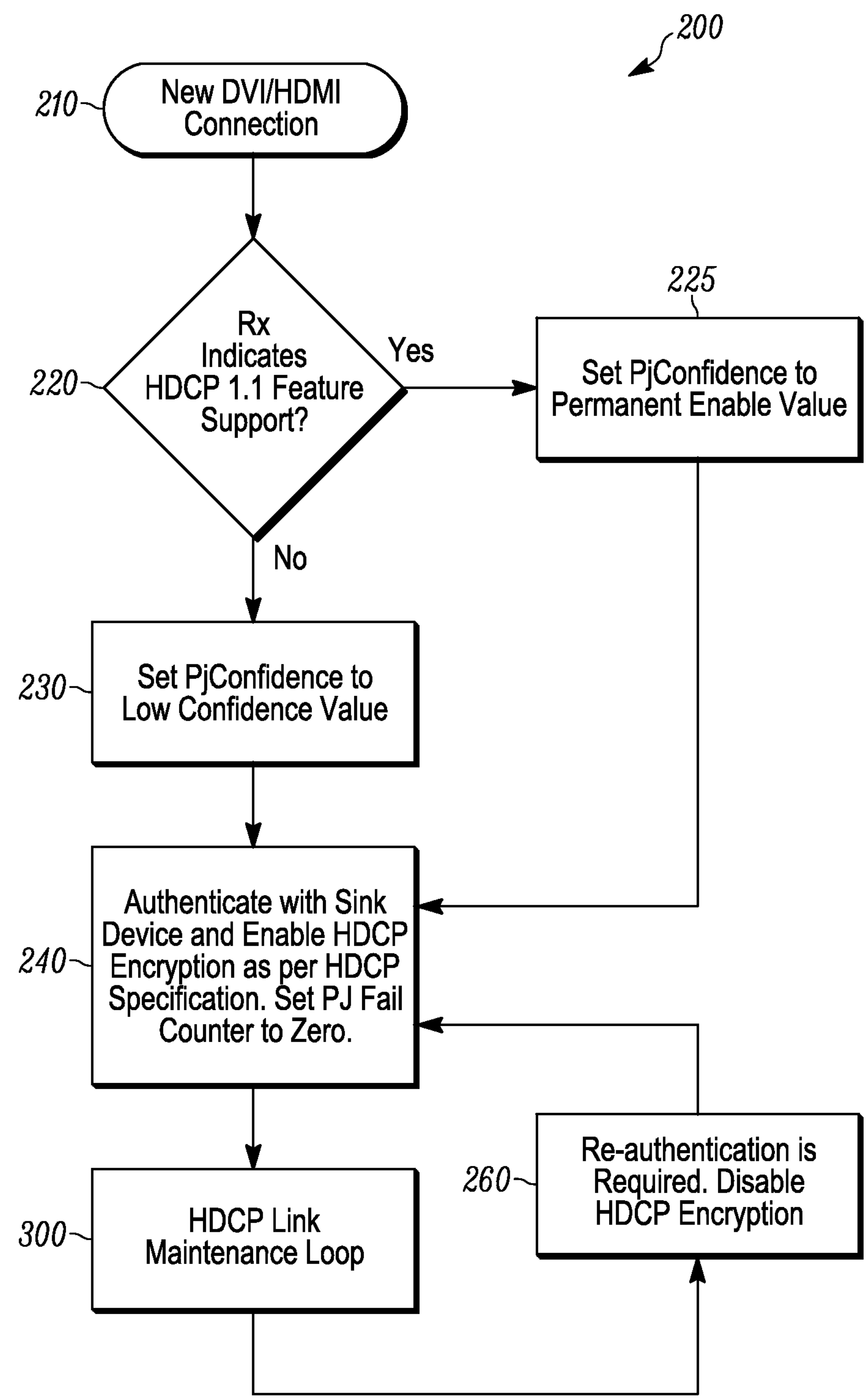
FIG. 2 is a flow diagram that illustrates a method for checking HDCP link integrity according to an embodiment of the present invention.

FIG. 2 is a flow diagram that illustrates a method 200 for checking HDCP link integrity according to an embodiment of the present invention.

In step 210, a new connection is made over an HDCP-protected interface, such as DVI or HDMI, between an upstream HDCP transmitter (Tx) 120 and a downstream HCDP receiver (Rx) 130. In an exemplary embodiment, Tx 120 and Rx 130 are HDCP devices in an HDCP system 100. In some embodiments, Tx 120 may be part of an HDCP repeater 140. In further embodiments, Rx 130 may be part of an HDCP repeater 140.

In step 220, Tx 120 determines whether Rx 130 indicates support for the 1.1 feature set. In an embodiment, Tx 120 receives from Rx 130, over the HDCP-protected interface, a Bcaps byte indicating capabilities of Rx 130, and checks the value of bit 1 of the Bcaps byte, which is the 1.1_FEATURES bit. The 1.1_FEATURES bit indicates that Rx 130 supports Enhanced Encryption Status Signaling, Advance Cipher, and Enhanced Link Verification options. The value of the 1.1_FEATURES bit will determine a value (PjConfidence) for indicating the level of confidence with which Tx 120 can determine that Enhanced Link Verification is supported by Rx 130.

In an exemplary embodiment, PjConfidence is an integer value within a range from 0 to 4, where 0 represents no confidence that Rx 130 supports Enhanced Link Verification, 1 represents Low Confidence, and 4 represents total confidence (Permanent Enable). In further embodiments, for example, PjConfidence may be represented as a percentage from 0 to 100, or as a value within a range from any selected value indicating no confidence to any selected value indicating total confidence.

If the 1.1_FEATURES bit is set to one (true), the method proceeds to step 225. If the 1.1_FEATURES bit is set to zero (false), the method proceeds to step 230.

At step 225, because the 1.1_FEATURES bit is set to one (true), the value of PjConfidence count is initialized to a value that indicates “Permanent Enable,” indicating that Tx 120 is fully confident that Rx 130 supports Enhanced Link Verification. In an exemplary embodiment, the Permanent Enable value is 4; however, another constant value (preferably higher than 3) may be chosen to represent Permanent Enable. When PjConfidence is set to Permanent Enable, Tx 120 will not disable checking of Pj values during HCDP link maintenance loop 300, even in case of repeated future mismatches of Pj values between Tx 120 and Rx 130. After the PjConfidence count is initialized to a value that indicates “Permanent Enable,” the method 200 proceeds to step 240.

At step 230, because the 1.1_FEATURES bit is set to zero (false), the value of PjConfidence count is initialized to a value that indicates "Low Confidence," indicating that Tx 120 is not fully confident that Rx 130 supports Enhanced Link Verification, but also has not fully ruled out the possibility that Rx 130 supports Enhanced Link Verification. In an exemplary embodiment, the Low Confidence value is 1; however, another constant value may be chosen to represent Low Confidence. The method 200 proceeds to step 240.

In step 240, Tx 120 authenticates with Rx 130 (i.e., the sink device) and enables HDCP encryption in accordance with the HDCP specification. Tx 120 also initializes a counter (Pj fail counter) for counting the number of mismatches between a Pj value at Tx 120 and a Pj value at Rx 130, as more fully discussed below. The Pj fail counter is initialized to a value of zero. The method 200 proceeds to step 300.

Step 300 is an HDCP link maintenance loop, as more fully described below with reference to FIG. 3.

When the HDCP link maintenance loop 300 is exited, the method proceeds to step 260 because re-authentication is required. Accordingly, Tx 120 disables HDCP encryption and proceeds to step 240 to re-authenticate.

Figure 3:
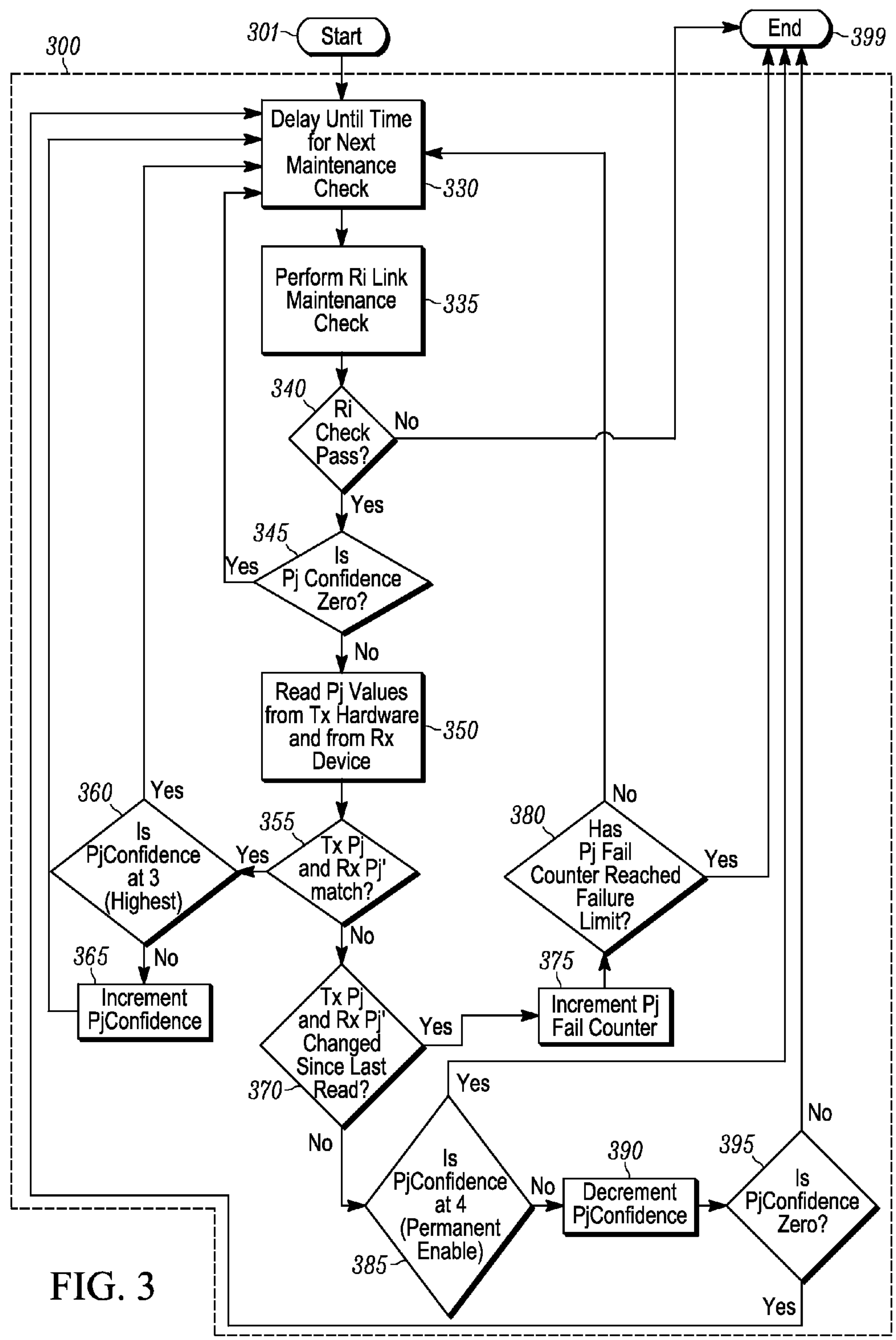
FIG. 3 is a flow diagram that further illustrates a method for checking HDCP link integrity according to an embodiment of the present invention.

FIG. 3 is a flow diagram that further illustrates a method 200 for checking HDCP link integrity according to a further embodiment of the present invention. At entry point 301, the method 200 enters HDCP link maintenance loop 300.

For an HDCP receiver 130 that does not indicate 1.1 feature support, PjConfidence was initialized to a value of Low Confidence (e.g., 1) prior to entering the HDCP link maintenance loop 300. In the link maintenance loop 300, following the Ri check, an embodiment checks the value of PjConfidence rather than checking the 1.1_FEATURE support bit reported by the receiver. With PjConfidence at Low Confidence, the method 200 proceeds to compare a Pj value calculated in Tx 120 with a Pj' value calculated in Rx 130 and made available by Rx 130 on the Pj' port. When the Pj and Pj' values match, there is a high likelihood that the receiver 130 supports Enhanced Link Verification, so PjConfidence is incremented. If, on the other hand, Pj and Pj' values do not match, and either Pj or Pj' is unchanged since the last time through the loop, PjConfidence is decremented. (In such a case, it is likely that Pj' is not being updated in the receiver, while the transmitter 120's Pj is internally updated.)

Thus, for an HDCP receiver 130 that does not indicate 1.1 feature support and that does not in fact contain support logic for Enhanced Link Verification, PjConfidence will decrement to zero, usually in the first pass through the maintenance loop 300. As PjConfidence is decremented, the Pj fail counter is not incremented and corrective action to re-authenticate the HDCP link is not triggered. When PjConfidence reaches zero, an embodiment disables the Pj check (e.g., steps 350 and 355) in all subsequent iterations of the loop 300.

Conversely, for an HDCP receiver 130 that does not indicate 1.1 feature support but that does in fact contain working support logic for Enhanced Link Verification, PjConfidence will increment, eventually maxing out at a highest permitted value (e.g., 3). As long as PjConfidence remains non-zero, Pj values are checked and the Pj fail counter is incremented in case of failure, which can eventually lead to the Pj fail counter reaching a failure limit that indicates that the receiver 130 may not be properly decrypting video and corrective action should be taken.

For receivers that indicate 1.1 feature support, PjConfidence was initialized to a value of Permanent Enable (e.g., 4) prior to the HDCP link maintenance loop 300. When PjConfidence is at the Permanent Enable value, it is never decremented and the Pj check (e.g., steps 350 and 355) is always performed.

An exemplary implementation of the HDCP link maintenance loop 300 is described in detail below.

At step 330, the loop 300 delays until a time is reached for a next maintenance check; e.g., until a desired frame counter is reached. In an exemplary implementation, thread processing is relinquished until time for the next read.

At step 335, an Ri link maintenance check is performed, in which Tx 120 compares its Ri value with the Ri' value read from Rx 130. At step 340, the Ri check is passed if the values of Ri and Ri' match, in which case the method 200 proceeds to step 345. The Ri check is not passed if the values of Ri and Ri' do not match, in which case the method 200 proceeds to step 399 to end the HDCP link maintenance loop 300.

At step 345, Tx 120 checks the value of PjConfidence. If PjConfidence is zero, indicating no confidence that Rx 130 supports Enhanced Link Verification, the method 200 returns to step 330 for another iteration of loop 300. If PjConfidence is not zero, indicating at least some confidence that Rx 130 supports Enhanced Link Verification, the method 200 proceeds to step 350. In alternative embodiments, a value other than zero may represent "no confidence," e.g., a negative value or a preselected constant value.

At step 350, Tx 120 reads Pj values from the HDCP transmitter 120 hardware and from the HDCP receiver 130. That is, Tx 120 reads a Pj value calculated in Tx 120, and reads a Pj' value calculated in Rx 130 and made available by Rx 130 on the Pj' port. At step 360, Tx 120 compares the Tx 120's Pj value with the Rx 130's Pj' value to determine whether they match, thus verifying the Pj' value against an internally generated Pj value. If they match, the method 200 proceeds to step 360. If they do not match, the method 200 proceeds to step 370.

At step 360, since the Pj values match, the Tx 120 can be increasingly confident that the Rx 130 supports Enhanced Link Verification. Tx 120 checks whether PjConfidence is already at a highest permitted value (e.g., 3). In some embodiments, the highest permitted value could be equal to the Permanent Enable value. If PjConfidence is already at the highest permitted value, the method 200 returns to step 330 for another iteration of loop 300. If PjConfidence is not already at the highest permitted value, the method 200 proceeds to step 365.

At step 365, PjConfidence is incremented, and the method 200 returns to step 330 for another iteration of loop 300.

At step 370, the method 200 checks whether the Pj values (i.e., the Tx 120's internally generated Pj value, and the Pj' value read from Rx 130 at step 350) have changed since the last time they were read, i.e., in a previous iteration of loop 300. Since step 370 takes place after a mismatch was determined (in step 355), step 370 determines whether this is a new failure, or a failure that already existed in the previous iteration of loop 300. If both of the Pj values have changed since it was previously read, the method 200 proceeds to step 375. If one or neither of the Pj values has changed since it was previously read, the method 200 proceeds to step 385.

At step 375, the Pj fail counter is incremented. Next, at step 380, the method 200 checks whether the Pj fail counter has reached a preset failure limit (e.g., 3 failures). If the preset failure limit has been reached, the method 200 proceeds to step 399 to end the HDCP link maintenance loop 300. If the preset failure limit has not yet been reached, the method 200 returns to step 330 for another iteration of loop 300.

At step 385, the Tx 120 checks whether the value of PjConfidence is equal to the Permanent Enable value. If so, the method 200 proceeds to step 399 to end the HDCP link maintenance loop 300. If not, at step 390 the value of PjConfidence is decremented.

At step 395, the Tx 120 checks whether the value of PjConfidence is equal to zero. If not, the method 200 proceeds to step 399 to end the HDCP link maintenance loop 300. If so, the method 200 returns to step 330 for another iteration of loop 300.

At exit point 399, the method 200 ends the HDCP link maintenance loop 300, and proceeds to step 260.

Figure 4:
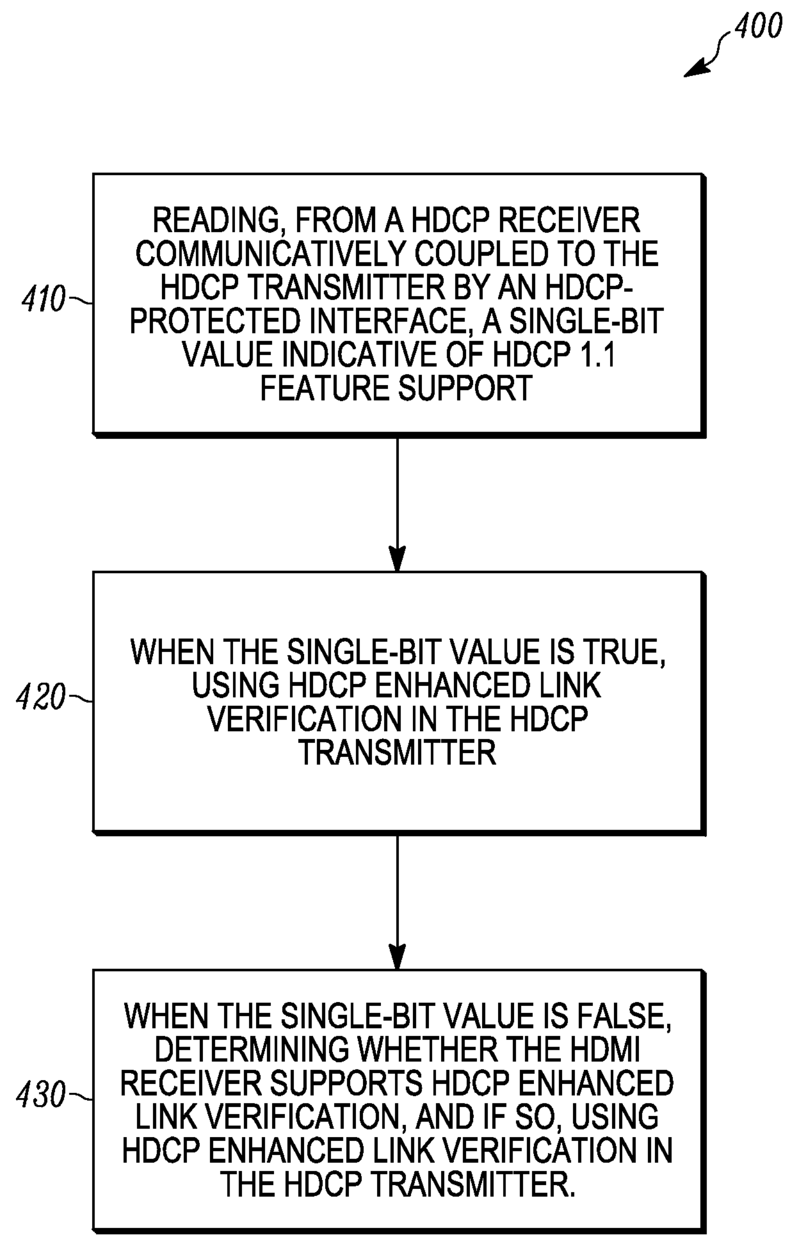
FIG. 4 is a flow diagram that illustrates a simplified method for checking HDCP link integrity according to a further embodiment of the present invention.

FIG. 4 is a flow diagram that illustrates a simplified method for checking HDCP link integrity according to a further embodiment of the present invention.

At step 410, an HCDP transmitter reads, from an HDCP receiver communicatively coupled to the HDCP transmitter by an HDCP-protected interface, a single-bit value indicative of HDCP 1.1 feature support.

At step 420, when the single-bit value is true, HDCP Enhanced Link Verification is used in the HDCP transmitter.

At step 430, when the single-bit value is false, the HDCP transmitter determines whether the HDMI receiver supports HDCP Enhanced Link Verification, and if so, the HDCP transmitter uses HDCP Enhanced Link Verification in the HDCP transmitter.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

What is claimed is:

1. A method in a High-bandwidth Digital Content Protection (HDCP) transmitter for checking HDCP link integrity, the method comprising:

reading, from an HDCP receiver communicatively coupled to the HDCP transmitter by an HDCP-protected interface, a single-bit value indicative of HDCP 1.1 feature support;

when the single-bit value is true, using HDCP Enhanced Link Verification in the HDCP transmitter;

when the single-bit value is false, determining whether the HDCP receiver supports HDCP Enhanced Link Verification, and if so, using HDCP Enhanced Link Verification in the HDCP transmitter; and initializing a confidence level (PjConfidence), indicative of confidence that the HDCP receiver supports HDCP Enhanced Link Verification, to an initial value based upon the single-bit value.

2. The method of claim 1 further comprising:

if the single-bit value is true, setting the initial value of PjConfidence to a first value indicating permanent enablement; and if the single-bit value is false, setting the initial value of PjConfidence to a second value indicating low confidence.

3. The method of claim 1, further comprising:

in a loop, if the value of PjConfidence is not set to a value indicating no confidence, reading a first Pj value from the HDCP receiver, and verifying the first Pj value against a second Pj value internally generated by the HDCP transmitter;

in the loop, adjusting the value of PjConfidence based at least on whether the first Pj value matches the second Pj value.

4. The method of claim 3 wherein the step of adjusting further comprises:

incrementing the value of PjConfidence if the first Pj value matches the second Pj value;

decrementing the value of PjConfidence if the first Pj value fails to match the second Pj value and if the first and second Pj values have not both changed since the previous iteration of the loop.

5. The method of claim 4 wherein the step of incrementing is not performed if PjConfidence has already reached a highest permitted value.

6. The method of claim 4 wherein the step of decrementing is not performed if PjConfidence is set to a value indicating permanent enablement.

7. A High-bandwidth Digital Content Protection (HDCP) transmitter for checking HDCP link integrity, the HDCP transmitter comprising:

an HDCP-protected interface configured for reading, from an HDCP receiver communicatively coupled to the HDCP transmitter by the HDCP-protected interface, a single-bit value indicative of HDCP 1.1 feature support;

wherein the HDCP transmitter is configured, when the single-bit value is true, to use HDCP Enhanced Link Verification in the HDCP transmitter;

wherein the HDCP transmitter is further configured, when the single-bit value is false, to determine whether the HDCP receiver supports HDCP Enhanced Link Verification, and if so, to use HDCP Enhanced Link Verification in the HDCP transmitter; and wherein the HDCP transmitter is further configured to initialize a confidence level (PjConfidence), indicative of confidence that the HDCP receiver supports HDCP Enhanced Link Verification, to an initial value based upon the single-bit value.

8. The HDCP transmitter of claim 7, wherein the HDCP transmitter is further configured, if the single-bit value is true, to set the initial value of PjConfidence to a first value indicating permanent enablement; and wherein the HDCP transmitter is further configured, if the single-bit value is false, to set the initial value of PjConfidence to a second value indicating low confidence.

9. The HDCP transmitter of claim 7, wherein the HDCP transmitter is further configured to perform a loop;

wherein in the loop, if the value of PjConfidence is not set to a value indicating no confidence, the HDCP transmitter is configured to read a first Pj value from the HDCP receiver, and to verify the first Pj value against a second Pj value internally generated by the HDCP transmitter;

wherein in the loop, the HDCP transmitter is further configured to adjust the value of PjConfidence based at least on whether the first Pj value matches the second Pj value.

10. The HDCP transmitter of claim 9 wherein being configured to adjust the value of PjConfidence further comprises:

wherein the HDCP transmitter is configured to increment the value of PjConfidence if the first Pj value matches the second Pj value, and wherein the HDCP transmitter is further configured to decrement the value of PjConfidence if the first Pj value fails to match the second Pj value and if the first and second Pj values have not both changed since the previous iteration of the loop.

11. The HDCP transmitter of claim 10 wherein the HDCP transmitter is configured not to increment the value of PjConfidence if PjConfidence has already reached a highest permitted value.

12. The HDCP transmitter of claim 10 wherein the HDCP transmitter is configured not to decrement the value of PjConfidence if PjConfidence is set to a value indicating permanent enablement.

13. A non-transitory computer readable medium comprising stored instructions which, when executed by a processor in a High-bandwidth Digital Content Protection (HDCP) transmitter, perform a method for checking HDCP link integrity, the method comprising:

reading, from an HDCP receiver communicatively coupled to the HDCP transmitter by an HDCP-protected interface, a single-bit value indicative of HDCP 1.1 feature support;

when the single-bit value is true, using HDCP Enhanced Link Verification in the HDCP transmitter;

when the single-bit value is false, determining whether the HDCP receiver supports HDCP Enhanced Link Verification, and if so, using HDCP Enhanced Link Verification in the HDCP transmitter; and initializing a confidence level, indicative of confidence that the HDCP receiver supports HDCP Enhanced Link Verification, to an initial value based upon the single-bit value.

* * * * *